United States Patent [19]

Roy

[11] Patent Number: 4,757,997

[45] Date of Patent: Jul. 19, 1988

[54] GOLF CLUB SHAFT AND METHOD OF MANUFACTURE

[75] Inventor: Paul A. Roy, Poway, Calif.

[73] Assignee: Fiber-Speed International, Inc., Naples, Fla.

[21] Appl. No.: 895,728

[22] Filed: Aug. 12, 1986

Related U.S. Application Data

[63] Continuation-in-part of Ser. No. 871,303, Jun. 6, 1986.

[51] Int. Cl.$^4$ ............................................. A63B 52/10
[52] U.S. Cl. .............................. 273/80 R; 273/80 B; 273/DIG. 23; 428/367; 428/377; 428/902; 156/189; 156/190; 156/192
[58] Field of Search ................. 273/80 R, 80 B, 80 C, 273/80 A, 80.9, DIG. 23; 156/170–180, 189, 190, 192, 195; 138/130, 137, 144; 428/367, 377, 902, 368, 388, 36

[56] References Cited

U.S. PATENT DOCUMENTS

| | | |
|---|---|---|
| 1,594,801 | 8/1926 | Stackpole . |
| 2,934,345 | 4/1960 | Scott . |
| 3,313,541 | 4/1967 | Benkoczy et al. . |
| 3,646,610 | 2/1972 | Jackson ............................ 273/80 R |
| 3,963,236 | 6/1976 | Mann . |
| 3,998,458 | 12/1976 | Inoue et al. ...................... 273/80 R |
| 4,023,801 | 5/1977 | VanAuken ....................... 273/80 B |
| 4,097,626 | 6/1978 | Tennent ........................ 273/80 R X |
| 4,122,593 | 10/1978 | Braly . |
| 4,135,035 | 1/1979 | Branen et al. ................. 273/80 B X |
| 4,157,181 | 6/1979 | Cecka ............................... 273/80 R |
| 4,240,631 | 12/1980 | MacDougall . |
| 4,455,022 | 6/1984 | Wright . |

FOREIGN PATENT DOCUMENTS

1246539 9/1971 United Kingdom .

Primary Examiner—David A. Scherbel
Assistant Examiner—Richard E. Chilcot, Jr.
Attorney, Agent, or Firm—Willian Brinks Olds Hofer Gilson & Lione

[57] ABSTRACT

A golf club shaft of increased playability and feel is manufactured with a generally hollow and tapered cylindrical wall comprised of a plurality of layers of fibers and a resin binding the plurality of layers of fibers together into an integrated structure. The shaft includes a portion of constant outer diameter adjacent one end adapted to accept a grip and a portion of a smaller constant diameter adjacent the other adapted to be fitted to the hosel of a club head and a portion intermediate the two end portions with a uniformly tapering diameter. The golf club comprises a plurality of layers of fibers arranged and oriented within the shaft to resist torsional deflection and to provide a controlled and variable flexural resistance, permitting the player to recover energy stored in the shaft during the swing and to apply that energy to the ball for greater distance. The inner and outer layers of fibers include fibers running both perpendicular and parallel to the longitudinal axis of the shaft. The central layers include fibers running longitudinally along, or spiralling at a selected angle around, the axis of the shaft. A tip insert is added to more flexible shafts adjacent their smaller end with fibers oriented at complementary 45-degree angles to the longitudinal axis of the shaft to provide torsional rigidity without a material addition of longitudinal stiffness and to prevent failure of the shaft at its smaller end. The shaft permits a golf club manufacturer, with a reasonable inventory of such shafts, to manufacture sets of golf clubs with controllable, flex characteristics that may be fitted to individual golfers.

24 Claims, 3 Drawing Sheets

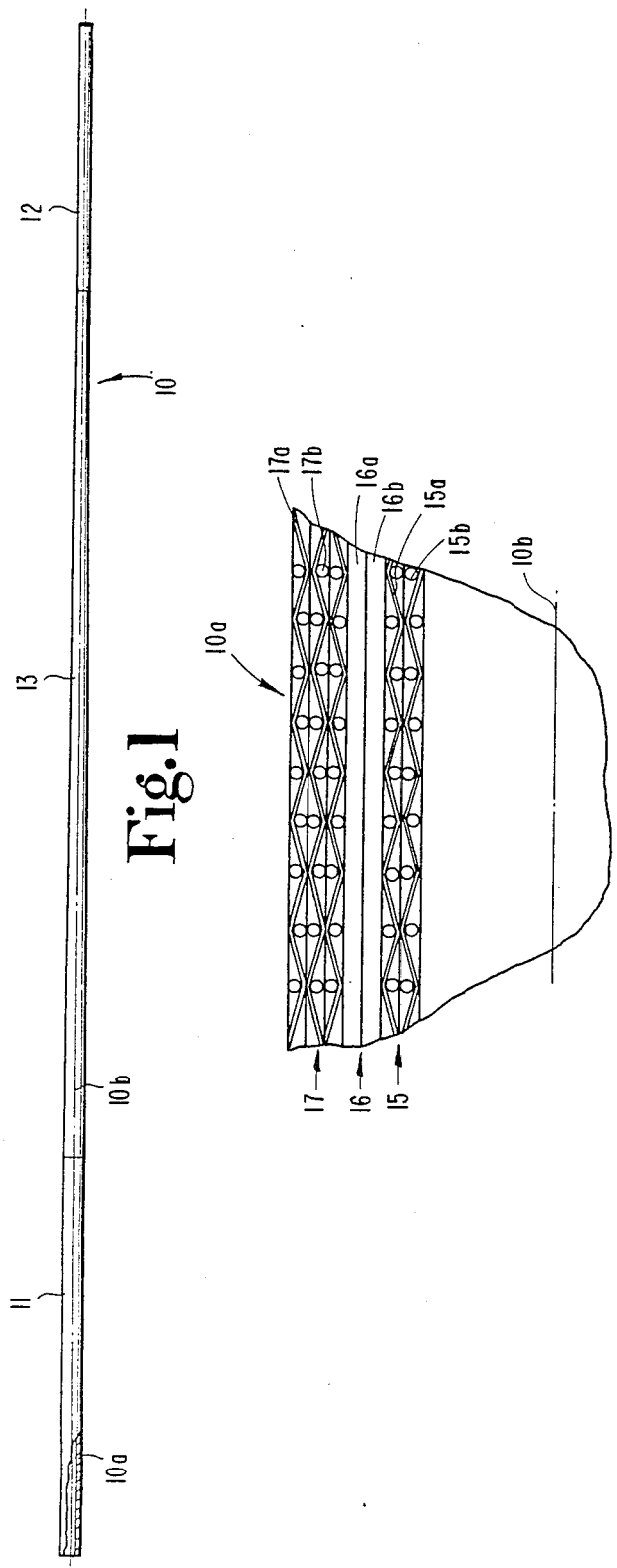

GOLF CLUB SHAFT AND METHOD OF MANUFACTURE

This is a continuation-in-part application of U.S. Ser. No. 06/871,303 filed June 6, 1986.

BACKGROUND OF THE INVENTION

This invention relates to improved golf club shafts and methods of manufacturing golf club shafts.

The shaft is the most important part of a golf club. It couples the golfer to the club head by which the golfer strikes the ball and is the primary component by which the golfer can manipulate the club head in executing the shot which he has planned. The playability of a golf club and its "feel" (that is, the ability of the golf club to reproduce the shot intended by the golfer and to instill confidence in the golfer through his kinesthetic senses that he can produce the intended shot) are primarily attributable to the shaft of a golf club.

In the backswing of a golfer, the golf club is accelerated and moved rather slowly to the top of the golfer's backswing; and the golf club shaft flexes insignificantly but should transmit the feel of the club head to the golfer through the golfer's grip at the end of the shaft. As the golfer executes his shot from the top of the backswing, however, the golf club shaft experiences first the flexural and torsional forces imposed on the golf shaft by the high acceleration and the offset weight of the club head, and then the further and abrupt imposition of flexural and torsional forces as the club head strikes the stationary ball and frequently the ground from which the ball is played. The complex forces imposed on the club shaft are further complicated by the variety of terrain on which golf is played. The terrain of some golf courses is soft, lush grass growing on well-watered and soft earth. On other golf courses, however, the grass may be thin and sparse and growing on hardened clay. Still other courses may be built on a sandy or loamy soil. Each of these different playing conditions imposes different forces in the golf club shaft as the golfer hits the ball from the surface of the course. In addition, the golf club shaft must frequently be used to play the ball from dense, heavy vegetation which is allowed to grow off the fairway of a golf course, or from the sand of traps. Under all these varying conditions, it is desirable for the golfer be confident that his golf club is playable to produce the shot he intends.

As a result of the forces imposed on a golf club during a shot, the golf club shaft bends along its longitudinal axis and twists somewhat as the golfer swings the club from the top of his backswing at the ball. Because of the resiliency of the golf club shaft, the bending and twisting of the shaft, due to its rapid acceleration at the top of the backswing, will be released; and the period of this release (the timing of the recovery of the bending) is an important factor in the consistency with which a golfer may hit the ball and the playability and feel of the club. In addition, the golf club shaft stores energy during the bending of the shaft as the golfer accelerates the club from the top of his backswing; and this energy may be returned to the ball as it is struck if the resiliency of the golf club shaft can be timed by the golfer to return the golf club shaft to its original straight position as the club head strikes the ball. The return of energy by the golf club shaft to the head of the club and the golfer's ability to time his swing to take advantage of that return of energy are two factors which can produce distance in the travel of the golf ball; and the ability to hit a golf ball long distances, when desired, is always advantageous in the game of golf. This, of course, means the golf club shaft, for best results, should be capable of matching the period of release of energy stored by flexure with the natural tempo of the golf swing of the golfer using the club.

Torsional deflection of the shaft and the release of energy stored as a result of such torsional deflection, while it may theoretically contribute a small additional energy to the golf ball and contribute to the distance of the resulting shot, are generally undesirable because the possible angular deflection of the face of the club from the intended line of flight introduces a source of angular error in the intended flight of the golf ball which is hardly ever desirable.

It is important and desirable to minimize the weight of the golf club shaft to the extent possible and consistent with providing the golf club shaft with the desired flexural characteristics. It is also important that the golf club as a whole not weigh too much and that it feels easily manipulatable in the hands of the golfer. For maximum energy transfer from the golf club to the ball, it is desirable that the maximum amount of the weight of the golf club be concentrated immediately behind the ball, i.e., at the face of the golf club, as the club moves through the ball. Thus, concentration of a high portion of the weight of the golf club behind the face of the ball, release of the energy stored in the golf club shaft as the ball leaves the face of the golf club, and minimum angular deflection from the original position of the golf club face are desirable properties to be obtained in a golf club and as a result of the use of a most desired golf club shaft.

The population of golfers, of course, is almost infinite in its variety of age, strength, suppleness, athletic ability, physical coordination, hand/eye coordination, kinesthetic sensitivity, ability to concentrate, and ability to execute golf shots. Thus, some golfers rely heavily upon their strength; some rely upon their suppleness and coordination; still others have a natural combination of strength, suppleness, coordination and ability to execute a golf shot; and, of course, many golfers have a poor ability to play golf. Because of the almost infinite variety of physical differences and abilities of golfers, an almost infinite variety of golf club shafts may be used to provide golfers with the best marriage between their abilities to swing the club and the ability of the golf club to produce a reproducible and intended golf shot.

It is not possible, of course, for a golf club manufacturer to inventory the almost infinite variety of golf club shafts needed to satisfy this requirement, even for a single club of a set of clubs. The golf club manufacturer's problem is further complicated by an additional variable in the lengths of golf shafts needed to manufacture the multiplicity of clubs that are used in playing golf. The length of a golf club shaft, for example, varies from about forty-two to forty-three inches for a driver's shaft to about thirty- one to thirty-two inches for a pitching iron shaft; and there are anywhere from about twelve to fourteen clubs included within a complete standard set of golf clubs with each of the twelve to fourteen clubs having a shaft of a different length. In addition, the length of the shaft ideally varies with the stature of the golfer, the matching of golf shafts to a golfer's stature being generally determined by the height of a golfer's hands from the surface of the earth on which the golfer stands.

Golf club manufacturers cannot afford to stock the enormous inventory of golf club shafts necessary to satisfy the variety of lengths and flexural characteristics that are needed to produce clubs having the playability and feel suited to the variety of golfers playing the game. In order to minimize the inventory of golf club shafts and reduce the golf manufacturers' investment in such an inventory, golf club manufacturers have frequently adopted five standard flexes for golf club shafts. These five standard flexes are designated generally as extra stiff, stiff, regular, flex, and ladies' grades; and these standard flexes are used both in the carbon steel shafts of the type used in the vast majority of clubs and in the clubs made of fiber/resin composites.

In the manufacture of steel shafts, some effort has been made to control the flex and feel of the shaft by forming the steel shafts with a plurality of linear portions of different diameters; thus, by controlling the diameter of the steel shaft at various portions of its length, the flex of the shaft can be controlled. The deflection of a structural shaft increases as the moment of inertia of its cross section (generally its diameter) decreases. The flexural characteristics of the steel shaft can be only slightly varied by varying the composition of the steel from which the shaft is made. The manufacture of golf club shafts from resin/fiber composites offers a greater opportunity to vary the flexural characteristics of the shaft and provides, generally, a lighter shaft.

There have been substantial prior efforts to solve the inventory problem and provide a golf club shaft that may be suited to a variety of golfers. Examples of patents directed to such prior efforts include: U.S. Pat. Nos. 1,594,801; 2,934,345; 3,313,541; 3,963,236; 4,122,593; 4,240,631; and 4,455,022; and British Pat. No. 1,246,539. Of the above patents, U.S. Pat. Nos. 2,934,345; 3,313,541; and 4,455,022 are directed to golf club shafts including fiberglass. U.S. Pat. Nos. 4,122,593; 4,240,631; 4,455,022; and British specification No. 1,246,539 are directed to a single master golf shaft which may be cut to provide the variable lengths and flexural characteristics to accommodate the variety of golf clubs in a set and the variety of golfers.

These prior efforts, however, have not satisfactorily solved the problem of providing a golf club shaft that permits the variety of lengths and dynamic characteristics that may provide playable sets of golf clubs with good feel to golfers of all abilities and that can reduce the inventory of shafts of golf club manufacturers while permitting the manufacture of golf clubs that can be matched to the stature, strength, swing tempo, physical coordination, and kinesthetic sensitivity of a variety of golfers.

BRIEF SUMMARY OF THE INVENTION

The invention comprises a generally hollow and tapered golf club shaft having a wall comprised of a plurality of layers of fibers and a resin binding the plurality of layers of fibers together into an integrated structure, and having a portion of constant diameter adjacent one end adopted to accept a grip and a portion of a smaller constant diameter adjacent the other end adopted to be fitted to the hosel of a club head. The shaft is made with constant lengths, for example, about forty-five to about forty-seven inches for use with woods, such as a driver, and about thirty-nine to about forty-one inches for irons. The portion of the shaft intermediate the two ends of constant diameter is formed with a uniformly tapering diameter. The shaft permits a golf club manufacturer to provide a golf club with controllable flex by shortening the shaft at either the larger diameter end portion or the smaller diameter end portion or at both end portions.

The golf club shaft comprises a plurality of layers of fibers arranged and selectively oriented within the shaft to resist torsional deflection and to provide a controlled and variable flex, permitting the player to recover energy stored in the shaft during the swing and to apply that energy to the ball for greater distance. The fibers of the shaft are bonded together and integrated as a whole by an adhering resin, preferably epoxy. The inner and outer layers of fiber include fibers running perpendicular to the longitudinal axis of the shaft and running longitudinally along the axis of the shaft to control the shaft flex. The inner layer or layers include fibers that may run longitudinally along the axis of the shaft or may be oriented to spiral around the longitudinal axis of the shaft at selected angles to obtain varied flex along the longitudinal axis of the shaft and varied resistance to torsional deflection of the shaft. For longer shafts, such as the shafts for woods, two layers of angularly oriented fibers may be added to the shaft, preferably in its inner layers, adjacent only its smaller diameter club head end.

In manufacturing the shaft, a resin impregnated, fiber cloth is cut into inner and outer blanks that are slightly longer than the shaft and have fibers running both parallel and perpendicular to their long dimension. One or more central blanks, also slightly longer than the shaft, are cut from a closely bound, parallel array of fibers with the fibers running parallel to, or at selected angles with respect to, the long dimension of the blank. A steel mandrel is provided at a somewhat elevated temperature. The fiber blanks are wound onto the steel mandrel to form the shaft with inner and outer groups of layers, including fibers running perpendicular to and parallel to the longitudinal axis of the mandrel, and a central group of layers, including fibers running along the longitudinal axis of the shaft or at selected angles around the longitudinal axis of the shaft. In manufacturing shafts for irons, additional torsional resistance must be considered because the golf shots played with irons by good players entail intentional impact between the iron club head and the earth by the golfer, i.e., good players take a divot with their iron shots. Such impacts impose severe torsional forces on the golf club shaft. The effect of such torsional forces is resisted by the inclusion of angularly oriented fibers, preferably in the central layers of the shaft. In manufacturing more flexible and longer shafts, an additional layer of fibers is generally wound onto the mandrel intermediate the inner group and central group of layers and adjacent the small end of the shaft to which the club head is attached. In manufacturing these flexible shafts, the additional layer of fibers is cut from a resin-impregnated fiber cloth as a blank having a length of about forty percent of the length of the shaft with the fibers preferably oriented at complementary forty-five degree angles with respect to long dimension of the additional blank; and the blank is wound onto the inner blank with the fibers oriented at forty-five degrees with respect to the central axis of the shaft and extending from the tip end of the shaft for about forty percent of its length.

When the blanks have been wound onto the mandrel, the mandrel and blanks are compressed, preferably with a tightly wound plastic tape; and the shaft and mandrel are placed in an oven at an elevated temperature for a time sufficient to cure the resin and bond the fibers and resin into an integrated whole to provide a shaft of exceptional playability and feel.

BRIEF DESCRIPTION OF THE DRAWINGS

FIG. 1 is a partial cross-sectional view of a shaft of this invention;

FIGS. 1A and 1B are enlarged cross sections of the walls of the golf club shafts showing the layers of fibers;

FIGS. 2-10 illustrate the steel mandrel and fiber blanks used in the manufacture of this invention;

FIG. 2 is a drawing of the steel mandrel on which the golf shaft of this invention is manufactured;

FIG. 3 is a drawing of the fiber blank for the inner layers of fibers for the shafts of wood clubs;

FIG. 4 is a drawing of the fiber blank for a tip insert of the shaft for the shafts of wood clubs;

FIG. 5 is a drawing of the fiber blank for the central layers of fibers for the shafts of wood clubs;

FIG. 6 is a drawing of the fiber blank for the outer layers of fibers for the shafts of wood clubs;

FIG. 7 is a drawing of the fiber blank for the inner layers of fibers for the shafts of iron clubs;

FIG. 8 is a drawing of the fiber blank for the central layers of fibers for the shafts of iron clubs;

FIG. 9 is a drawing of the fiber blank for the central layers of fibers for shafts of iron clubs; and FIG. 10 is a drawing of the fiber blank for the outer layers of fibers for shafts of iron clubs.

DETAILED DESCRIPTION OF THE PREFERRED EMBODIMENTS

Figure 3:
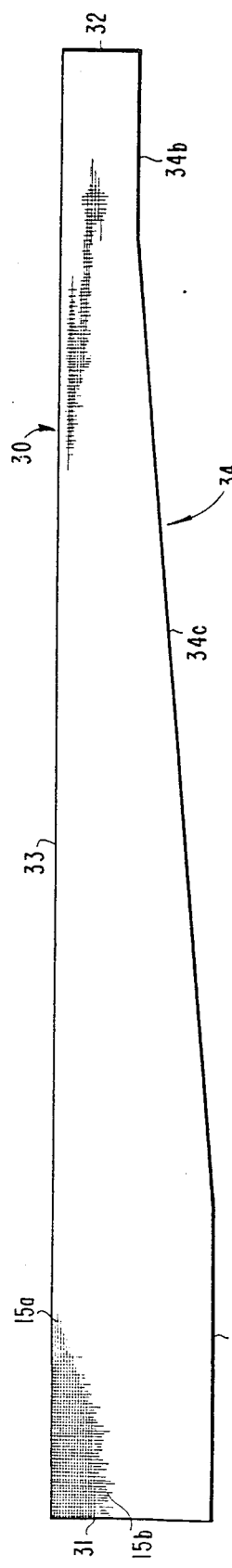

FIG. 1 shows a plan view of a golf shaft 10 of this invention in partial cross section. The golf shaft is hollow and includes three portions. One end portion 11 extends several inches from one end of the shaft with a constant outside diameter, preferably about 0.620 inch. A second portion 12 of constant diameter extends several inches from the other end of the shaft with a smaller diameter, preferably about 0.335 inch to about 0.370 inch on the outside and 0.230 on the inside. The central portion 13 of the shaft extends between end portions 11 and 12 with a uniformly decreasing taper from the larger end 11 to the smaller end 12. The length of the end portions 11 and 12 of the shaft extends several inches to permit constant diameter portions to be trimmed from the golf shaft in adjusting it to the shaft length needed for a particular club and to the flexural characteristics desired by a golfer. By several inches, I mean the portion 11 may have a length from about eight inches to about twelve inches; and the portion 12 may have a length from about four inches to about eight inches. In a preferable embodiment of shaft 10 for woods, portion 11 is about twelve inches long and portion 12 is about six inches long. In a preferable embodiment of shaft 10 for irons, portion 11 is about eight inches long and portion 12 is about four inches long.

The golf club shaft 10 is comprised of a plurality of layers of fibers and a resin to adhere the fibers into an integrated structure. The golf shaft 10 is a generally hollow, tapered structure with uniformly thick walls 10a, 10c.

A cross section of the wall 10a of golf shaft 10 for woods is shown in FIG. 1A. The wall 10a of golf shaft 10 includes preferably about six to about eight layers that include glass fibers. Each layer of glass fibers contributes a thickness of about 0.006 inch to the walls of the shaft, and the total wall thickness for preferable glass shafts is about 0.048 inch. As shown in FIG. 1A, the golf shaft comprises three distinct groups of layers 15-17. The inner group 15 is formed of two to three layers of glass fibers woven to provide a multiplicity of fibers 15a extending generally parallel to the central axis 10b of the shaft 10 and a multiplicity of glass fibers 15b that extend around the central axis 10b of shaft 10 substantially perpendicular to the axis 10b of the shaft. The central group 16 includes about two layers and comprises a multiplicity of glass fibers that extend substantially parallel to the axis 10b of the shaft 10. The outer group 17 comprises two to three layers for flexible shafts and three to four layers for more rigid shafts. The glass fibers of the outer layers include fibers 17a which run generally parallel to the longitudinal axis 10b of shaft 10 and fibers 17b which extend around the longitudinal central axis 10b of the shaft 10 and lie substantially perpendicular to the central axis.

Larger end 11 is adapted in the shaft 10 to accept a grip, which, as known in the art, is frequently a molded rubber member slipped over the end 11 to fit the hands of the player and permit the player to more comfortably grip the shaft. The other smaller end 12 has a uniform diameter extending eight inches from the end and is adapted to be fitted to the hosels of wood golf club heads.

FIG. 2 is a drawing of the steel mandrel 20 on which the golf club shaft 10 is manufactured. As shown in FIG. 2, the steel mandrel 20 includes a first portion 21 in the form of a right circular cylinder having an outside diameter of about 0.540 inch and a length of about eighteen inches. The first portion 21 of the steel mandrel forms the first portion 11 of the golf club shaft which is adapted to receive a grip. The steel mandrel 20 includes a second portion 22 in the form of a right circular cylinder having an outside diameter of 0.230 inch and having a length of eight inches extending from the other end of the steel mandrel. The second portion 22 of the steel mandrel 20 forms the tip end of the golf club shaft which is adapted to be fitted to the hosel of a golf club head. The intermediate third portion 23 of the steel mandrel extends twenty-eight inches between the first portion 21 and the second portion 22 of the steel mandrel and tapers uniformly from the larger diameter of 0.54 inch at the grip end to the diameter of 0.23 inch at the tip end. Thus, the total length of the steel mandrel is about fifty-four inches.

FIG. 3 is a plan view of a base or inner blank 30 of the resin-impregnated glass fiber cloth which is cut to form the inner layers 15 of the golf club shaft 10 for woods. As shown in FIG. 3, the blank 30 is a polygon having a straight base 33 about forty-seven inches long, a wide end 31, and a narrow end 32. Ends 31 and 32 lie generally at right angles to base 33. Wide end 31 has a width of about 5.20 inches, and narrow end 32 has a width of about 2.4 inches in more flexible wood shafts and a width of about 4.1 inches in stiffer wood shafts. As noted from FIG. 3, the fourth side 34 of the polygon includes a first portion 34a which is parallel to the base 33 for a distance extending about twelve inches from the end 31 and a second portion 34b which is parallel to the base 33 for a distance extending about six inches from end 32. The portions 34a and 34b of side 34 are connected by central portion 34c, providing a uniform reduction in blank width between the larger end 31 and the smaller end 32 of blank 30. As indicated in FIG. 3, the blank 30 is cut from a resin-impregnated, glass fiber cloth which provides glass fibers running at right angles to one another. The specific, preferred, glass, fiber cloth is 4557 style with S-2 glass, as manufactured, for example, by Clark-Schwebel Corporation; and it is cut so that the majority of the glass fibers contained in the glass cloth (the 57 end per inch warp yarn) run parallel to the base 33 of the blank, as indicated by 15a of FIG. 3. A smaller portion of the glass fibers 15b of the cloth (the 30 end per inch fill yarn) run generally at right angles to the base 33 of the blank and to the fibers 15a. While it is not intended that the ratio of the number of glass fibers running parallel to base 33 to the number of glass fibers running transversely of the base 33 be limiting, it is desirable that approximately two times as many glass fibers extend parallel to the base 33, as shown in 15a, as extend perpendicular to the base 33, as shown in 15b.

Figure 4:
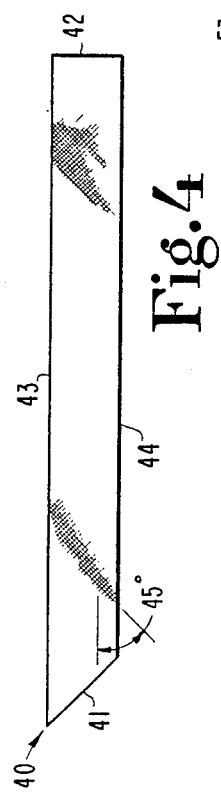

FIG. 4 shows a tip insert 40 of a type incorporated into the wood club shafts having greater flexibility. The tip insert blank 40 is in the form of a trapezoid having a base 43 of about twenty inches in length, an end 41 forming a selected angle of about forty-five degrees with respect to the base 43, and a second end 42 extending at right angles from the base 43. The fourth side 44 of the tip insert blank extends between the first side 41 and the second side 42 parallel to the base 43. The width of tip insert 40 between the base 43 and the fourth side 44 is preferably about 1.7 inches or about 2.5 inches as set forth below. The tip insert blank 40 is cut from the same glass cloth as the base blank 30 (FIG. 3); however, the tip insert blank 40 is cut in such a manner that the glass fibers are oriented at complementary forty-five degree angles with respect to the base 43 as indicated in FIG. 4. Thus, the tip end blank 40 is cut so that the majority of fibers 18a form a forty-five degree included angle with respect to base 43, and the perpendicular fibers of the glass cloth 18b form a complementary forty-five degree angle with respect to the base 43. The tip insert 40, because of the angular orientation of the glass fibers to the axis of the shaft when assembled into the shaft, will not materially increase the longitudinal stiffness of the shaft but will increase its torsional stiffness, decrease its torsional deflection, and substantially reduce the tendency of the shaft to fail because of separation of the glass fibers at its smaller end.

Figure 5:

FIG. 5 shows the glass blank 50 used to form the central layers 16 of glass fibers of the wood club shaft 10. As shown in FIG. 5, the blank 50 for the central layers 16 includes a straight base 53 having a length of about forty-seven inches, a first end 51, and a second end 52. The fourth side 54 extends between ends 51 and 52 and uniformly decreases the width between the fourth side 54 and the base 53. The first end 51 is preferably about 3.9 inches wide, and the narrow end is preferably about 1.9 inches wide. The central blank 50 is cut from a parallel array of resin-impregnated, glass fibers which run in only one direction. The material for the central blank 50 is a unidirectional, glass tape with S-2 glass fibers, as manufactured, for example, by Ferro Corporation. The blank is cut so that the glass fibers 16a making up the blank 50 are generally parallel to the base 53. Blank 50 is used in the manufacture of shafts of all flexes.

Figure 6:
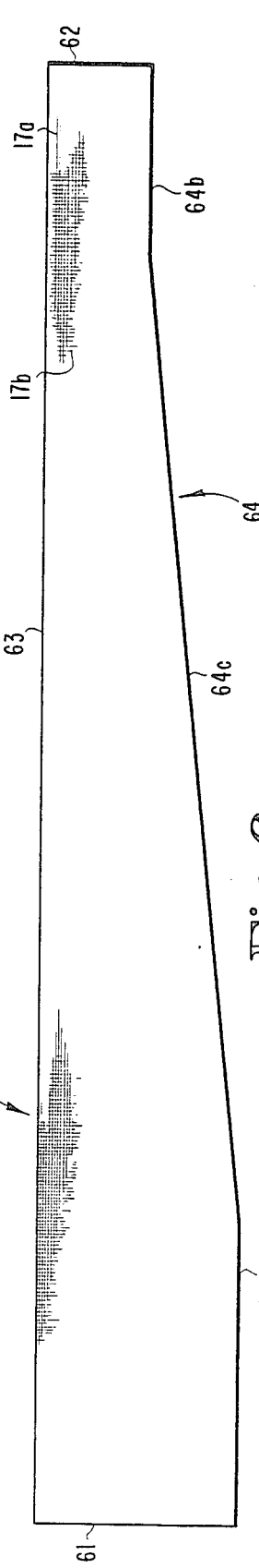

FIG. 6 shows the blank 60 for the outer layers 17 of glass fibers that make up the golf shaft 10 for woods. The blank 60 includes a straight base 63 about forty-seven inches long, a first end 61, and a second end 62. Ends 61 and 62 lie substantially perpendicular to the base 63. The fourth side 64 includes a first portion 64a extending parallel to the base 63 for about twelve inches from end 61 and a second portion 64b extending parallel to the base for about six inches from end 62. The intermediate portion 64c of side 64 interconnects portion 64a and 64b at its ends and uniformly reduces the blank width between portions 64a and 64b. For the manufacture of more flexible golf shafts, the first end 61 is about 5.7 inches wide, and the second end 62 is about 2.9 inches wide. For stiffer golf shafts, the first end 61 is about 7.5 inches wide; and the second end 62 is about four inches wide. The outer blank 60 is cut from the same glass cloth as inner blank 30 and the tip insert blank 40. Like the inner blank 30, the outer blank 60 is cut in such a manner that the majority of the glass fibers in the glass cloth are oriented parallel to the base 63, as indicated at 17a, with the transverse fibers 17b lying substantially perpendicular to the base 63.

In this invention, shafts 10 are manufactured by selecting the combination of blanks to provide three different shafts having identical internal diameters but variable wall thicknesses in critical portions of the shaft to provide three different golf shafts having three inherently different flexural characteristics of the longitudinal axis.

These three different grades of shafts, designated as 1-2, 3-4 and 5-6, have flexes uniformly spaced throughout the most desirable range of shaft flexes and permit, by simple cutting, six standard flexes, 1 through 6, and variable shaft flexes between these six standard flexes.

The following table illustrates the selection of blanks used in combination with the common, central blank 50 to manufacture three wood shafts of this invention:

| SHAFT FLEX | INNER BLANK (30) | | OUTER BLANK (60) | | TIP INSERT (40) |
| --- | --- | --- | --- | --- | --- |
| | Grip End Width | Tip End Width | Grip End Width | Tip End Width | Width |
| 1-2 | 5.2 | 2.4 | 5.7 | 2.9 | 2.5 |
| 3-4 | 5.2 | 2.4 | 7.5 | 4.0 | 1.7 |
| 5-6 | 5.2 | 4.1 | 7.5 | 4.0 | |

In the invention, the mandrel is sprayed or wiped with a liquid release agent and heated or maintained at a temperature of 110° F. The base 33 of blank 30 is aligned with the longitudinal axis of the mandrel 20 and is rolled onto the mandrel while being pressed tightly to the surface of the mandrel and to itself as it completes more than one circumference of the mandrel. If a tip insert 40 is incorporated into the shaft adjacent the club head end, the tip insert blank 40 is first married to the base blank 30 by removal of its release paper and by adhering the tip insert blank 40 adjacent end 32 of the base blank 30.

When the base blank 30 (with, if used, the tip insert 40) is tightly in place over the steel mandrel 20, the central blank 50 is added to the assembly. Any release paper is removed from blank 50, and its base 53 is aligned with the central axis of the steel mandrel 20, preferably at the place on the circumference where the last layer of blank 30 generally ends. Blank 50 is then pressed into an adhering relationship with blank 30 (and if used, tip insert blank 40) and is rolled tightly onto and into engagement with blank 30 on mandrel 20. The tip insert thus provides a plurality of layers of fibers that spiral around the longitudinal axis of the shaft, with the fibers lying at angles of about +45° and −45° with respect to planes including the longitudinal axis of the shaft.

The outer blank 60 is then added to the golf shaft assembly by aligning its base 63 with the longitudinal axis of the mandrel 20, preferred at the place on the circumference where the last layer of blank 50 generally ends, and wrapping the blank 60 over the blank 50 and onto the mandrel 20.

The ends 31, 51, and 61 of the inner, central, and outer blanks are aligned at one end of the shaft; and the other ends 32, 52, 62 (and, where the tip insert is used, end 42) are aligned at the other end of the shaft. After all the blanks are in place on the mandrel, pressure is applied to the wraps and the mandrel by tightly spiral-wrapping the entire shaft with preferably a polypropylene, or TEDLAR, tape having a width of about one-half to about three-quarters of an inch. (TEDLAR is a trademark of the E. I. du Pont de Nemours & Company.)

The tape-wrapped shaft and mandrel are then placed in an oven to cure the resin. In the preferred embodiment, the resin is epoxy; and the shaft assembly is cured at a temperature of about 300° F. for one hour to cure the epoxy resin and bind the fibers of the shaft into an integrated structure. After about one hour, the shaft and mandrel are removed from the oven and cooled to about 250° F. The tape wrap is removed from the shaft, and the golf shaft is removed from the mandrel. The cured shaft is then coated with a clear epoxy for cosmetic purposes. The grip end 11 of the shaft may be masked to prevent the application of clear epoxy or may be ground after coating to remove the clear epoxy. In addition, a fraction of an inch may be trimmed from the ends either before or after the shaft is coated with clear epoxy.

The above procedure is used to manufacture golf club shafts of this invention in three basic flexes as indicated above, designated as flex 1-2, flex 3-4, and flex 5-6. In manufacturing shafts for wood clubs (i.e., driver, 3 wood, 5 wood, etc.) with flex 1-2 and flex 3-4, the base blank 30 is cut to provide its tip end 32 with a width of about 2.4 inches and its grip end 31 with a width of about 5.2 inches. For shafts having flex 1-2, the outer blank 60 has a width of about 2.9 inches at the tip end 62 and about 5.7 inches at the grip end 61. The tip insert 40 of a shaft with a 1-2 flex is of about 2.5 inches wide.

For the manufacture of wood club shafts with a 3-4 flex, the inner blank 30 is formed with a width at the tip end 32 of about 2.4 inches and with the width of the grip end 31 about 5.2 inches. The outer blank 60 has a width at the tip end 62 of about 4.0 inches and a width at the grip end 61 of about 7.5 inches. The tip insert 40 has a width of about 1.7 inches.

In manufacturing wood club shafts with a 5-6 flex, the inner blank 30 has a width at its tip end 32 of about 4.1 inches and a width of its grip end of 5.2 inches. The outer blank 60 has a width at its tip end 62 of about 4.0 inches and a width at its grip end 61 of about 7.5 inches. Tip inserts 40 are generally not included in the manufacture of shafts with the 5-6 flex, although they may be used if desired for heavier shafts.

The central blank 50 used in the manufacture of shafts with 1-2, 3-4, and 5-6 flexes has, as indicated above, a width of 3.9 inches at the grip end 51 and a width of 1.9 inches at the tip end 52.

As indicated above, the preferred material for the inner blank 30, the tip insert 40, and the outer blank 60 is a 4557 weave style glass fiber cloth with S-2 glass fibers impregnated with a good structural epoxy resin. The specifications for such a an epoxyimpregnated glass fiber cloth, as manufactured, for example, by the Clark-Schwebel Corporation, are:

| Yarn count (ends per inch) | 57 × 30 |
| Warp yarn | SCG 150½ |
| Fill yarn | SCG 150½ |
| Weight (ounces per square yard) | 5.42 |
| Thickness | 0.0055 |
| Breaking strength | 350 × 60. |

The inner blank 30 and the outer blank 60 are cut with the warp yarn oriented so it will run parallel to the long axis of the shaft as manufactured. The tip insert 40 is cut so that the glass fibers run at forty-five degrees with respect to the long axis of the shaft.

In shafts with flex 1-2, the inner blank 30 constitutes about thirty-four percent of the glass fibers in the shaft; the central blank 50 constitutes about twenty-eight percent of the glass fibers; and the outer blank 60 constitutes about thirty-eight percent. In shafts with flex 3-4, the inner blank 30 constitutes about thirty-one percent of the glass fibers in the shaft; the central blank 50 constitutes about twenty-five percent of the glass fibers; and the outer blank 60 constitutes about forty-four percent. In shafts with flex 5-6, the inner blank 30 constitutes thirty-six percent of the glass fibers in the shaft; the central blank 50 constitutes about twenty-three percent of the glass fibers; and the outer blank 60 constitutes about forty percent of the glass fibers. Where a tip insert blank is used, it constitutes seven percent to nine percent of the total glass fibers in the shaft.

The three wood shafts offer a reasonable variety of flexes to meet the need of both skilled and unskilled golfers. A further material variation in the flex of a golf club manufactured with golf shafts of this invention is obtained in trimming the club to length. For example, using the most flexible base shaft, i.e., flex 1-2 to manufacture a driver, flex 1 is obtained if the golf shaft is assembled by trimming two inches from the grip end of the shaft; and flex 2, the next step in stiffness, is arrived at by trimming two inches from the tip end of the flex 1-2 shaft. Variations of flex between flex 1 and flex 2 can be obtained by selectively trimming from both the grip end and the tip end of the shaft before it is assembled into the driver. Golf club shafts can be manufactured with stiffness increasing in generally uniform steps from flex 1 to flex 6 by the above procedure.

Unlike the measurement of flex in most golf clubs, which is accomplished by clamping the grip end and hanging a weight on the tip end of the shaft, the flex of a golf shaft of this invention is measured at both ends of the shaft to better fit the shaft to the player and produce a more consistent and playable golf club. Thus, golf shafts of this invention are measured for flex by clamping each end, in turn, and affixing a weight to the unclamped end to determine the shaft deflection. A typical deflection of a driver shaft of this invention with the grip end clamped and with a five-pound weight hung on the shaft at thirty-five inches from the grip end will be about four to about six inches measured at forty-two and three-quarter inches from the grip end of the shaft. In the reverse mode, with the tip of the same shaft clamped and a five-pound weight hung on the shaft thirty-five inches from the tip end, a deflection of from about nine to about seventeen inches will be measured at a point forty-two and three-quarters inches from the tip end.

Flex 1-2 shafts of this invention weigh approximately eighty grams plus or minus four grams. Flex 3-4 shafts of this invention weigh about eighty-nine grams plus or minus four grams; and flex 5-6 shafts of this invention weigh ninety-two grams plus or minus four grams. Ordinarily, in their finished form, wood shafts are trimmed to a length of about forty-five inches plus or minus one eighth of an inch.

Figure 1B:
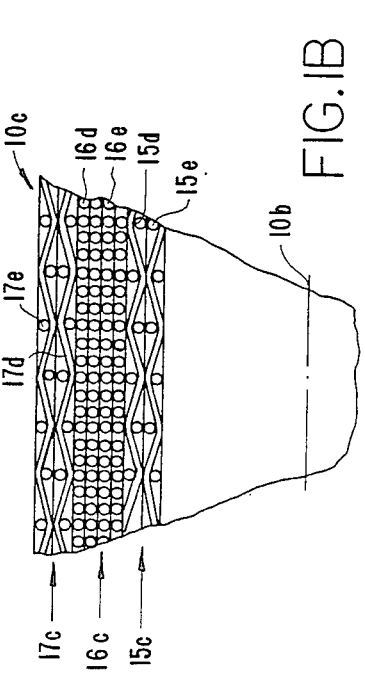

A cross section of the wall 10c of golf shaft 10 for irons is shown in FIG. 1B. The wall 10c of golf shaft 10 includes preferably about eight layers that include fibers. Each layer of fibers contributes a thickness of about 0.006 inch to the walls of the shaft, and the total wall thickness for preferable glass shafts is about 0.048 inch. As shown in FIG. 1B, the golf shaft comprises three distinct groups of layers 15c, 16c, and 17c. The inner group 15c is formed of two to three layers of glass fibers woven to provide a multiplicity of fibers 15d extending generally parallel to the central axis 10b of the shaft 10 and a multiplicity of glass fibers 15e that extend around the central axis 10b of shaft 10 substantially perpendicular to the axis 10b of the shaft. The central group 16c includes about four layers and comprises a multiplicity of graphite fibers that extend generally around the axis 10b of the shaft 10 at selectively varied angles. The four layers of graphite fibers include two layers of fiber 16d that spiral around the axis 10b at selected angles of about 20° to about 45° with respect to a plane through axis 10b and two layers of fibers 16e that spiral around the axis 10b at angles of about 340° to about 315° (about −20° to about −45°) with respect to a plane through axis 10b. The outer group 17c comprises about two layers of glass fibers, including fibers 17d which run generally parallel to the longitudinal axis 10b of shaft 10 and fibers 17e which extend around the longitudinal central axis 10b of the shaft 10 and lie substantially perpendicular to the central axis.

Larger end 11 is adapted in the shaft 10 to accept a grip, which, as known in the art, is frequently a molded rubber member slipped over the end 11 to fit the hands of the player and permit the player to more comfortably grip the shaft. The other smaller end 12 has a uniform diameter extending four inches from the end and is adapted to be fitted to the hosels of iron golf club heads.

The shafts for iron golf clubs may also be manufactured on steel mandrel 20, which is shown in FIG. 2 and described above.

Figure 7:
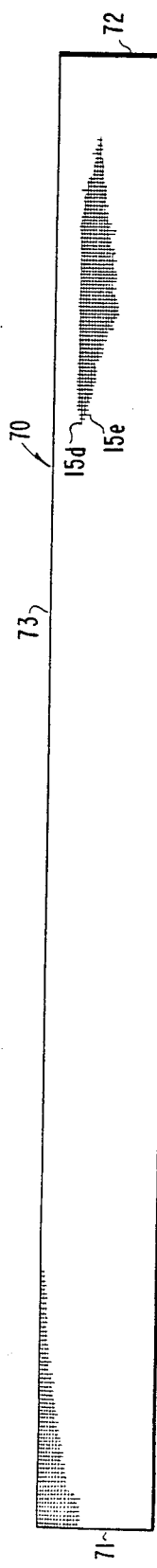

FIG. 7 is a plan view of a base or inner blank 70 of the resin-impregnated glass fiber cloth which is cut to form the inner layers 15c of the iron club shaft 10. As shown in FIG. 7, the blank 70 is a rectangle having a straight base 73 about forty-one inches long and opposite side 74. Ends 71 and 72 lie generally at right angles to base 73 and have a width of about 3.30 inches. As indicated in FIG. 7, the blank 70 is cut from a resin-impregnated, glass fiber cloth which provides glass fibers running at right angles to one another. The specific, preferred, glass, fiber cloth is 4557. style with S-2 glass, as manufactured, for example, by Clark-Schwebel Corporation; and it is cut so that the majority of the glass fibers contained in the glass cloth (the 57 end per inch warp yarn) run parallel to the base 73 of the blank, as indicated by 15d of FIG. 7. A smaller portion of the glass fibers 15e of the cloth (the 30 end per inch fill yarn) run generally at right angles to the base 73 of the blank and to the fibers 15d. While it is not intended that the ratio of the number of glass fibers running parallel to base 73 to the number of glass fibers running transversely of the base 73 be limiting, it is desirable that approximately two times as many glass fibers extend parallel to the base 73, as shown in 15d, as extend perpendicular to the base 73, as shown in 15e.

Figure 8:
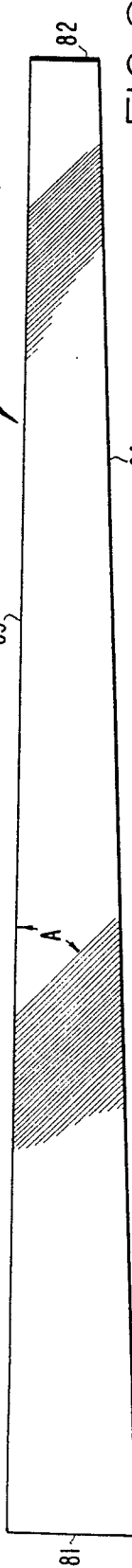
Figure 9:
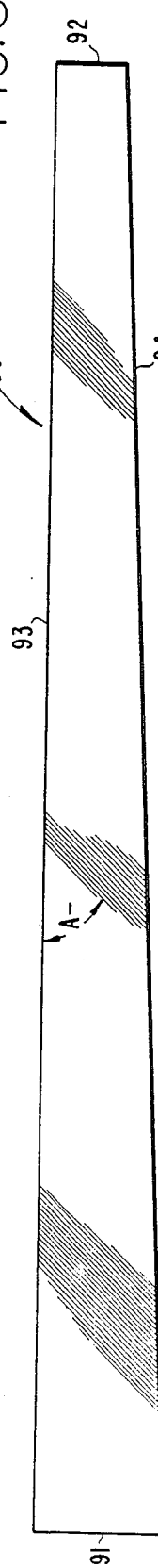

FIGS. 8 and 9 are plan views of blanks 80 and 90 for the central layers 16c of the iron club shafts. The blanks 80 and 90 are in the form of trapezoids having bases 83 and 93 of about forty-one inches in length and ends 81, 82, 91, and 92 extending at right angles from the base 83. The first sides 81 and 91 of blanks 80 and 90 are about 3.7 inches wide, and the second sides 82 and 92 are about 1.7 inches wide. The fourth sides 84 and 94 of the central blanks extend between the first sides 81 and 91 and the second sides 82 and 92 in a straight line. The blanks 80 and 90 are cut from preferably a unidirectional graphite fiber-epoxy resin tape with a fiber ariel density of 150 grams/meter$^2$. Such a unidirectional graphite fiber epoxy resin tape is manufactured by Ferro Corp. and sold under its designation No. CE 321 R. The blanks 80 and 90 are cut in such a manner that the graphite fibers are oriented at selective varied angles with respect to their bases 83 and 93 as indicated in FIGS. 8 and 9. Thus, the blanks 80 and 90 are cut so that the fibers 16d and 16e form included angles A and −A with respect to bases 83 and 93, respectively. The selected angles A and −A are selected to lie within about +20° to about +45° and about −20° to about −45°, respectively, with respect to bases 83 and 93. The angular orientation of the graphite fibers to the bases 83 and 93 is selected to control the longitudinal flex of the shaft and its resistance to torsional deflection. The angularly oriented fibers, when assembled into the shaft, will not materially increase the longitudinal stiffness of the shaft but will increase its torsional stiffness, decrease its torsional deflection, and substantially reduce the tendency of the shaft to fail because of separation of the glass fibers at its smaller end. At positive and negative angles (A and −A) of about 45°, the shaft is more flexible along its longitudinal axis and less resistant to torsional deflection than at positive and negative angles (A and −A) of about 20°. In other words, as the angles A and −A decrease from about 45° to about 20°, the shaft flex decreases; and the resistance to torsional deflection increases.

Figure 10:
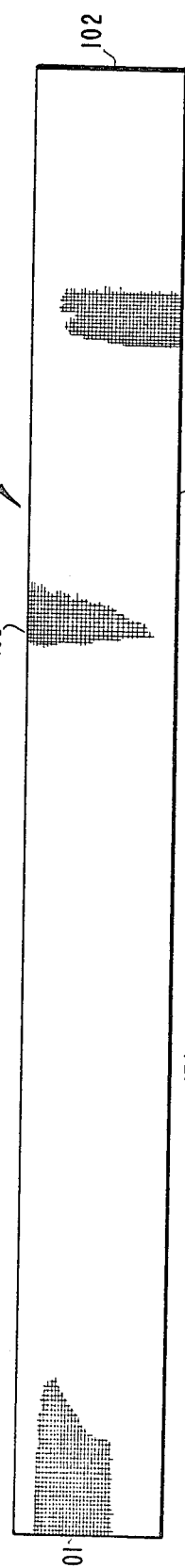

FIG. 10 shows the blank 100 for the outer layers 17c of fibers that make up the iron shaft 10. The blank 100 includes a straight base 103 about forty-one inches long and opposite side 104. Ends 101 and 102 lie substantially perpendicular to the base 103 and have a width of about 4.2 inches. The outer blank 100 is cut from the same glass cloth as inner blank 70. Like the inner blank 70, the outer blank 100 is cut in such a manner that the majority of the glass fibers in the glass cloth are oriented parallel to the base 103, as indicated at 17d, with the transverse fibers 17e lying substantially perpendicular to the base 103.

In this invention, iron shafts 10 are manufactured by selecting positive and negative angles (A and −A) to provide three different shafts having identical internal diameters but providing three different iron shafts having three different flexural characteristics of the longitudinal axis and three different torsional resistances.

These three different grades of iron shafts designated, as, for example, FS-100, FS-200, and FS-300, have flexes uniformly spaced throughout the most desirable range of iron shaft flexes. The following table illustrates the selection of the angular orientation of graphite fibers in the central layers to manufacture three iron shafts of this invention:

| SHAFT FLEX | ANGLES (Positive and Negative) |
| --- | --- |
| FS-100 (flex) | 45° |
| FS-200 (medium) | 30° |
| FS-300 (stiff) | 20° |

In the invention, iron shafts are manufactured by substantially the same procedure as wood shafts. The mandrel is sprayed or wiped with a liquid release agent and heated or maintained at a temperature of 110° F. The base 73 of blank 70 is aligned with the longitudinal axis of the mandrel 20 to provide a handle portion 11 that is eight inches long, and base 73 is rolled onto the mandrel while being pressed tightly to the surface of the mandrel and to itself as it completes more than one circumference of the mandrel.

When the base blank 70 is tightly in place over the steel mandrel 20, the central blanks 80 and 90 are added, one after the other, to the assembly. Any release papers are removed from blanks 80 and 90, and their bases 83 and 98 are aligned with the central axis of the steel mandrel 20, preferably at the place on the circumference where the last layer of blank 70 generally ends. Blank 80 is first then pressed into an adhering relationship with blank 70 and is rolled tightly onto and into engagement with blank 70 on mandrel 20. Blank 90 is then pressed into adhering relationship with blank 80 and is rolled tightly onto blank 80 and into the assembly.

The outer blank 100 is then added to the golf shaft assembly by aligning its base 103 with the longitudinal axis of the mandrel 20, preferred at the place on the circumference where the last layer of blank 90 generally ends, and wrapping the blank 100 over the blank 90 and onto the mandrel 20. The central layers of the shaft thus include fibers that spiral around the longitudinal axis of the shaft, with the fibers lying at angles within a range of about ±20° to about ±45° with respect to planes including the longitudinal axis of the shaft.

The ends 71, 81, 91, and 101 of the inner, central, and outer blanks are aligned at one end of the shaft; and the other ends 72, 82, 92, and 102 are aligned at the other end of the shaft. After all the blanks are in place on the mandrel, pressure is applied to the wraps and the mandrel by tightly spiral-wrapping the entire shaft with preferably a polypropylene, or TEDLAR, tape having a width of about one-half to about three-quarters of an inch. (TEDLAR is a trademark of the E. I. du Pont de Nemours & Company.)

The tape-wrapped shaft and mandrel are then placed in an oven to cure the resin. In the preferred embodiment, the resin is epoxy; and the shaft assembly is cured at a temperature of about 300° F. for one hour to cure the epoxy resin and bind the fibers of the shaft into an integrated structure. After about one hour, the shaft and mandrel are removed from the oven and cooled to about 250° F. The tape wrap is removed from the shaft, and the golf shaft is removed from the mandrel. The cured shaft is then coated with a clear epoxy for cosmetic purposes. The grip end 11 of the shaft may be masked to prevent the application of clear epoxy or may be ground after coating to remove the clear epoxy. In addition, a fraction of an inch may be trimmed from the ends either before or after the shaft is coated with clear epoxy.

In the iron shafts, the inner blank 70 constitutes about twenty-five percent of the fibers in the shaft; the central blanks 80 and 90 constitute about forty-three percent of the fibers; and the outer blank 100 constitutes about thirty-two percent.

The three iron shafts of the invention offer a reasonable variety of flexes to meet the need of both skilled and unskilled golfers.

This invention provides a golf shaft which is lighter; provides a greater, more predictable degree of flexibility; permits matching of the golf club characteristics to the abilities of a variety of players; and permits golf clubs that provide a greater distance than prior golf clubs. In addition, unlike prior clubs manufactured from fiberglass, the shaft of this invention is not subject to frequent fracture or excessive torsional deflection and may be cut to vary its flexibility in a predictable fashion and yet be fitted with club heads having the standard dimensions of the golf industry.

While a presently preferred embodiment of the invention is disclosed above, other embodiments may be apparent to those skilled in the art. The description of the preferred embodiment is not intended to be limiting, and the invention is limited only by the scope of the following claims:

I claim:

1. A golf club shaft, comprising a hollow, generally tapered shaft with a wall comprised of a plurality of groups of layers of glass fibers and a cured resin that binds the plurality of groups of layers of glass fibers together into an integrated structure, said shaft having one end having a diameter adapted to carry a golf grip on its outer surface and the other end having a diameter adapted to be fitted to the hosel of a club head, said groups of layers providing a majority of the fibers running parallel to the longitudinal axis of the shaft and a minority of the fibers arranged in innermost and outermost groups of layers running at 90° to the majority of fibers and encircling the shaft and providing a flexibility from the club head end to adjacent the grip end, permitting the shaft portion from the club head end to the grip end to bend more than nine inches when the grip end is loaded with about 14 foot-pounds of torque.

2. The golf club shaft of claim 1 wherein the wall of the shaft comprises an inner group of layers, a central group of layers, and an outer group of layers.

3. The golf club shaft of claim 2 wherein the central group of layers includes one or more layers of fibers that spiral at selected angles around the longitudinal axis of the shaft.

4. The golf club shaft of claim 3 wherein the selected angles are about +20° to about +45° and about −20° to about −45°.

5. The golf club shaft of claim 2 wherein there is an additional group of layers intermediate the inner group of layers and the central group of layers at the end of the shaft adapted to be fitted to the hosel of a club head.

6. The golf club shaft of claim 5 wherein the fibers of the additional group of fibers lie at a selected angle of about ±45° with respect to the longitudinal axis of the shaft.

7. The golf club shaft of claim 2 wherein the inner group of layers includes about 30 to 36 percent of the glass fibers in the shaft, the central group of layers contains about 23 to 28 percent of the glass fibers in the shaft, and the outer group of layers contains from about 38 to 44 percent of the glass fibers in the shaft.

8. The golf club shaft of claim 7 wherein the shaft includes additional woven glass fibers lying at complementary 45-degree angles with respect to the axis of the shaft for a distance of about 20 inches at the end of the shaft adapted to be fitted to the hosel of a club head.

9. The golf club shaft of claim 8 wherein the additional glass fibers at the end of the shaft to be fitted to a club head are about 7 to 9 percent of the glass fibers in the shaft.

10. The golf club shaft of claim 1 wherein said plurality of groups of layers of glass fibers comprises an inner group of layers comprising about two layers of woven glass fibers with their glass fibers arranged generally parallel and perpendicular to the longitudinal axis of the shaft, a central group of layers comprising about two layers with their glass fibers arranged generally parallel to the longitudinal axis of the shaft, and an outer group of layers comprising about two to four layers with their glass fibers arranged generally parallel and perpendicular to the longitudinal axis.

11. The golf club shaft of claim 1 wherein the cured resin is epoxy and the glass fibers are pre-impregnated with epoxy and arranged into groups of layers throughout its entire length, with outer and inner groups of layers being formed from woven and epoxy-impregnated glass fibers having the glass fibers oriented to lie parallel and perpendicular to the axis of the shaft, a central group being formed of glass fibers lying substantially along the axis of the shaft, and a fourth group of layers adjacent the end of the shaft to be fitted to a club head having epoxy-impregnated woven glass fibers oriented to lie at complementary angles of about 45 degrees with respect to the axis of the shaft, said cured epoxy bonding and integrating said glass fibers of the four groups of layers into a shaft with a selectable flex and minimal torsional deflection.

12. The golf club shaft of claim 1 wherein the weight of the shaft is from about 80 to about 95 grams.

13. The golf club shaft of claim 1 wherein said shaft comprises about eight layers of fibers in its wall with an inner group of layers comprising about two layers with glass fibers arranged generally parallel and perpendicular to the longitudinal axis of the shaft, a central group of layers comprising about four layers with graphite fibers arranged to spiral about the longitudinal axis of the shaft at selected angles of from about +20° to about +45° and form about −20° to about −45° and an outer group of layers comprising about two layers with their glass fibers arranged generally parallel and perpendicular to the longitudinal axis.

14. A golf club shaft having a central axis, comprising a hollow, generally tapered cylindrical wall comprised of a plurality of distinct groups of layers of elongated fibers, all of the layers of fibers being impregnated with a resin that is cured to bind the plurality of groups of layers of fibers together into an integrated structure, at least the innermost and outermost of the plurality of distinct groups of layers of fibers consisting of at least two layers of woven cloth whose warp fibers run parallel to the axis of the shaft and whose fill fibers are less numerous than the warp fibers and run at 90° to the wrap fibers to encircle the axis of the shaft.

15. A golf club shaft as set forth in claim 14 wherein two layers of parallel, resin-impregnated fibers lie between the innermost and outermost groups of fibers and the fibers in the two layers run parallel to the axis of the shaft.

16. A golf club shaft as set forth in claim 14 wherein four layers of paralle resin-impregnated fibers lie between the innermost and outermost groups of fibers, two of the layers of fibers spiralling around the axis of the shaft at an angle of between 20° and 45° in one direction and the other two layers of fibers spiralling around the axis in the opposite direction.

17. A golf club shaft as set forth in claim 14 wherein about 75 percent of the fibers are oriented longitudinally along the axis of the shaft and the remaining about 25 percent of the fibers lie at right angles to the longitudinal fibers.

18. A golf club shaft as set forth in claim 14 wherein the elongated fibers are glass.

19. A fiberglass-resin golf club shaft as set forth in claim 18 wherein the wall is comprised of three distinct groups of layers of elongated glass fibers, the outermost of the three distinct groups of layers of glass fibers consisting of at least two layers of woven glass cloth whose warp fibers run parallel to the axis of the shaft and whose fill fibers are less numerous than the warp fibers and run at 90° to the warp fibers to encircle the axis of the shaft.

20. A golf club shaft as set forth in claim 19 wherein a group of fibers lies between the innermost and outermost groups of fibers and comprises two layers of spaced apart parallel glass fibers impregnated in epoxy resin and running parallel to the axis of the shaft.

21. A golf club shaft as set forth in claim 18 wherein the wall is comprised of three distinct groups of layers of elongated glass fibers, the innermost group of fibers consisting of at least two layers of woven glass cloth whose warp fiber runs parallel to the axis of he shaft and whose fill layers are less numerous than the warp fibers and run at 90° to the wrap fibers to encircle the shaft.

22. A golf club shaft having a central axis, comprising a hollow, generally tapered cylindrical wall with a thickness of about 0.050 inch comprised of three distinct groups of layers of elongated glass fibers, all of the layers of glass fibers being impregnated with an epoxy resin that is cured to bind the three groups of layers of glass fibers together into an integrated structure, said shaft having an overall length of between 41 and 47 inches with a length having a constant diameter of about 0.635 inch at one end and a length having a constant diameter of about 0.325 inches at the other end, the innermost and outermost of the three distinct groups of layers of fibers both consisting of at least two layers of woven glass cloth whose warp fibers run parallel to the axis of the shaft and whose fill fibers are less numerous than the warp fibers and run at 90° to the warp fibers to encircle the axis of the shaft.

23. A golf club shaft as set forth in claim 22 wherein the shaft is 47 inches in length and the group of fibers lying between the innermost and outermost groups of fibers comprises two layers of spaced apart parallel glass fibers impregnated in epoxy resin and running parallel to the axis of the shaft.

24. A golf club shaft as set forth in claim 23 wherein the shaft is 41 inches in length and the group of fibers lying between the innermost and outermost groups of fibers comprises four layers of spaced apart parallel glass fibers, two of the layers of glass fibers spiralling around the axis of the shaft at an angle of between 20° and 45° in one direction and the other two layers of glass fibers spiralling around the axis in the opposite direction.

* * * * *

UNITED STATES PATENT AND TRADEMARK OFFICE
CERTIFICATE OF CORRECTION

PATENT NO. : 4,757,997

DATED : JULY 19, 1988

INVENTOR(S) : PAUL A. ROY

It is certified that error appears in the above-identified patent and that said Letters Patent is hereby corrected as shown below:

In col. 1, line 47, before "be", insert -- to --.

In col. 10, line 3, delete "a"; line 3, delete "epoxyimpregnated" and insert -- epoxy-impregnated -- therefor.

In col. 11, line 61 after 4557, delete "." (the period).

In col. 15, line 50 (claim 13, line 9) delete "form" and insert -- from -- therefor; line 65 (claim 14, line 12), delete "wrap" and insert -- warp -- therefor.

In col. 16, line 4 (claim 16, line 2), delete "paralle" and insert -- parallel -- therefor; line 34 (claim 21, line 5), delete "he" and insert -- the -- therefor; line 36 (claim 21, line 7), delete "wrap" and insert -- warp -- therefor.

Signed and Sealed this

Seventeenth Day of January, 1989

Attest:

DONALD J. QUIGG

Attesting Officer

Commissioner of Patents and Trademarks